United States Patent

Koshizuka

[11] Patent Number: 5,274,589
[45] Date of Patent: Dec. 28, 1993

[54] METHOD AND APPARATUS FOR WRITING AND READING DATA TO/FROM A MEMORY

[75] Inventor: Atsuo Koshizuka, Tokyo, Japan

[73] Assignee: Nippon Steel Corporation, Tokyo, Japan

[21] Appl. No.: 795,777

[22] Filed: Nov. 21, 1991

[30] Foreign Application Priority Data

Nov. 21, 1990 [JP] Japan .................. 2-319520

[51] Int. Cl.$^5$ ............................ G11C 11/40
[52] U.S. Cl. ................... 365/189.01; 365/219; 365/221
[58] Field of Search .......... 365/189.01, 219, 220, 365/221, 83

[56] References Cited

U.S. PATENT DOCUMENTS

| | | | |
|---|---|---|---|
| 4,369,504 | 1/1983 | Hanmura | 365/219 |
| 4,447,894 | 5/1984 | Imamura | 365/219 |
| 4,639,894 | 1/1987 | Ishii | 365/219 |
| 4,718,039 | 1/1988 | Aichelmann, Jr. et al. | 365/219 |
| 4,912,680 | 3/1990 | Masaki et al. | 365/221 |
| 4,945,518 | 7/1990 | Muramatsu et al. | 365/221 |
| 5,040,149 | 8/1991 | Ebihara et al. | 365/220 |
| 5,146,577 | 9/1992 | Babin | 365/219 |

FOREIGN PATENT DOCUMENTS 56-101261 8/1981 Japan .
58-53255 3/1983 Japan .

Primary Examiner—Eugene R. LaRoche
Assistant Examiner—Tan Nguyen
Attorney, Agent, or Firm—Pollock, Vande Sande & Priddy

[57] ABSTRACT

Method and apparatus for writing and reading data into/from a first-in-first-out (FIFO) memory having memory areas arranged in a matrix are disclosed in which data of a series of first words each represented by a predetermined first number of bits are stored such that the first words are sequentially stored in selected memory areas of the memory and the stored data is read out of the memory such that the stored words are read out as a series of second words each represented by a predetermined second number, different from said first number, of bits, and in the same order as that in which the words have been stored.

4 Claims, 3 Drawing Sheets

METHOD AND APPARATUS FOR WRITING AND READING DATA TO/FROM A MEMORY

BACKGROUND OF THE INVENTION

1. Field of the Invention

This invention relates to a method and apparatus for writing and reading data to/from a memory, and particularly to a method and apparatus for writing and reading data to/from a memory which has memory areas arranged in the form of a matrix.

2. Description of the Related Art

A recent information processing system incorporates, in order to perform optimal data processing, a first CPU for processing data of long bit-length (e.g., 16-bit words) and a second CPU for processing data of short bit-length (e.g., 4-bit words), so that it operates with the two CPUs selectively depending on the contents of individual processings. In this case, when 16-bit word data processed by the first CPU is stored in a first-in-first-out (FIFO) memory having memory areas in a matrix arrangement, as disclosed in Japanese Patent JP-A-58-53255 for example, and thereafter the stored data is processed by the second CPU, it is necessary to convert the 16-bit word data into 4-bit word data. However, since the memory does not have such a bit-length converting function, it is required to provide four FIFO memories, each having 4-bit memory areas, and a bus exchanger so that each 16-bit word processed by the first CPU is divided into four 4-bit words, which are stored respectively, in associated areas of the four memories, and the stored words are read out of the memories in series and then processed by the second CPU. On the other hand, when 4-bit words, which have been processed by the second CPU, are to be processed by the first CPU, four of the 4-bit words are fed through the bus exchanger and stored in the associated areas of the four memories so that the stored four 4-bit words are read out in parallel to form a 16-bit word, which is processed by the first CPU. The above-mentioned memory utilization is disclosed in Japanese Patent JP-A-56-101261 for example.

However, this data processing for bit-length conversion from four 4-bit words into a 16-bit word, and vice versa, by using a bus exchanger involves the problem of taking excessive processing time, resulting in a degraded throughput of the whole system. Another problem is its intricate hardware configuration, which results in a limited performance.

SUMMARY OF THE INVENTION

In order to solve the above prior art problem, an object of the invention is to provide method and apparatus for writing and reading data to/from a memory having memory areas arranged in a matrix. A long bit-length word stored in the memory is read out of the memory as a series of short bit-length words which are read out sequentially. In contrast, the short bit-length words, which have been stored in the memory sequentially, are read out of the memory in bit-parallel to form a long bit-length word. The long bit-length word is converted into plural short bit-length words and vice versa without using an intermediate circuit such as a bus exchanger.

In method and apparatus of the present invention, when writing and reading data into/from a first-in-first-out (FIFO) memory having memory areas arranged in a matrix, a plurality of first words each represented by a predetermined first number of bits are stored such that the first words are sequentially stored in selected memory areas of the memory. The stored data is read out of the memory such that the stored words are read out as a plurality of second words each represented by a predetermined second number, of bits different from said first number of bits, and in the same order as that in which the words have been stored.

According to one aspect of the present invention, a method of writing and reading out data into/from a first-in first-out memory having memory areas arranged in a matrix of rows and columns comprises the steps of: writing the data as a series of short words, each word represented by a short length of bits, into the memory such that the short words are successively stored in the respective rows of the memory. A predetermined number of the short words are written into the same number of the memory areas in one row. The data is read out from the memory in the same order as the order in which the data was written into the memory a predetermined number of short words stored in one row at a time.

According to another aspect of the present invention, a method of writing and reading out data into/from a first-in first-out memory having memory areas arranged in a matrix of rows and columns comprises the steps of: successively writing the data including a series of long words, each represented by a long length of bits, into the memory such that the long words are successively stored in the memory areas of the respective rows, one long word in one row. The data is successively read out of the memory in the same order as the order it was written into the memory such that one long word stored in each row is divided into a predetermined number of short words, each represented by a short length of bits.

According to a further aspect of the present invention, an apparatus for writing and reading-out data into/from a FIFO memory including a plurality of memory areas arranged in a matrix of rows and columns comprises: input means for writing received data into the memory such that a series of long words, each represented by a long length of bits, included in the received data are written successively in the respective rows of the memory each long word being separately written into a predetermined number of the memory areas in one row. Output means are provided for reading out the long words of the data from the memory in the same order as that in which the long words have been written into the memory successively as short words stored in the predetermined number of the memory areas of each row.

According to a still further aspect of the present invention, an apparatus for writing and reading-out data into/from a FIFO memory including a plurality of memory areas arranged in a matrix of rows and columns comprises input means for writing a series of short words, each represented by a short length of bits, successively into the respective rows of the memory, a predetermined number of the short words are written into the same number of the memory areas in one row. Output means are provided for reading out the short words successively in the same order as that in which the short words were written into the memory in the predetermined number of the memory areas of each row at a time to form a long word.

DESCRIPTION OF THE PREFERRED EMBODIMENTS

Figure 1:
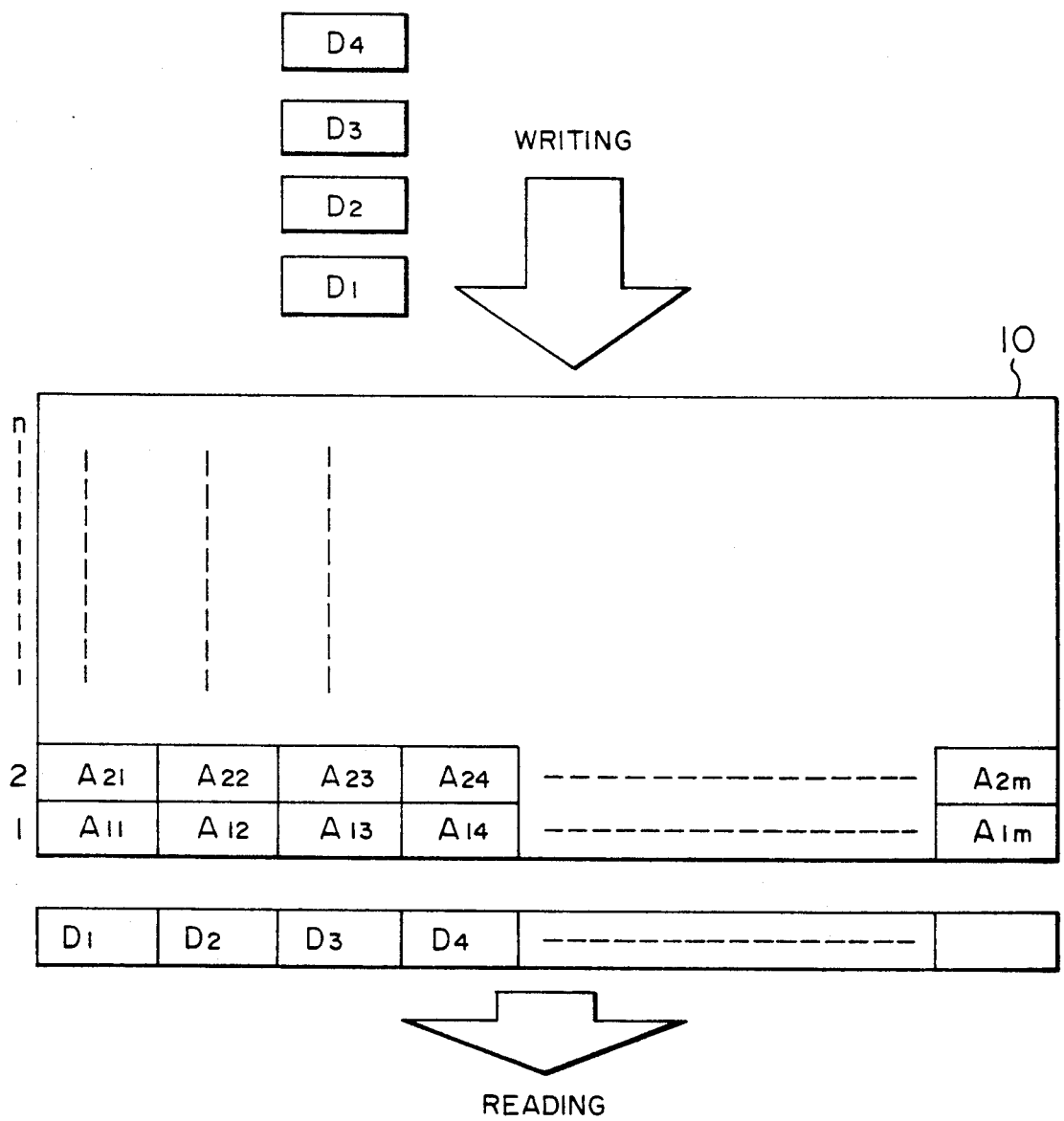
FIG. 1 is a diagram explaining a method of writing and reading data to/from the FIFO memory according to an embodiment of this invention.

An embodiment of this invention will be explained with reference to FIG. 1. In the figure, 10 is a first-in-first-out (FIFO) memory having memory areas Aik (i=1, 2, 3, ..., n; k=1, 2, 3, ..., m) each having an n-bit (e.g., n=4) capacity arranged in a matrix of rows and columns.

It is assumed that the system is designed to process 4-bit short words D1, D2, D3 and so on, which have been processed by a low-speed CPU (not shown), by a high-speed CPU (not shown) which is designed to process 16-bit long words. Short words D1, D2, D3 and D4 are stored in memory areas A11, A12, A13 and A14 on the first row of the memory 10 sequentially. Subsequently, short words D5, D6, D7 and D8 are stored in memory areas A21, A22, A23 and A24 of the second row sequentially. In this manner, 4-bit words provided by the low-speed CPU are stored in respective rows of the memory 10 sequentially such that each row contains four short words.

In reading the stored data out of the memory 10 for processing by the high-speed CPU, four short words stored on each row of memory are read out at a time as a single 16-bit long word. Initially, the 16 bits stored in the memory areas A11, A12, A13 and A14 on the first row of the memory are read out in parallel as a 16-bit long word, and next the 16 bits stored in the memory areas A21, A22, A23 and A24 on the second row are read out in parallel at one time. In this manner, the 16-bit words are read out of the respective rows of the memory in an order in which the 16-bit words have been written into the memory, while the 16-bit word stored in each row are read out in parallel at one time.

Figure 2:
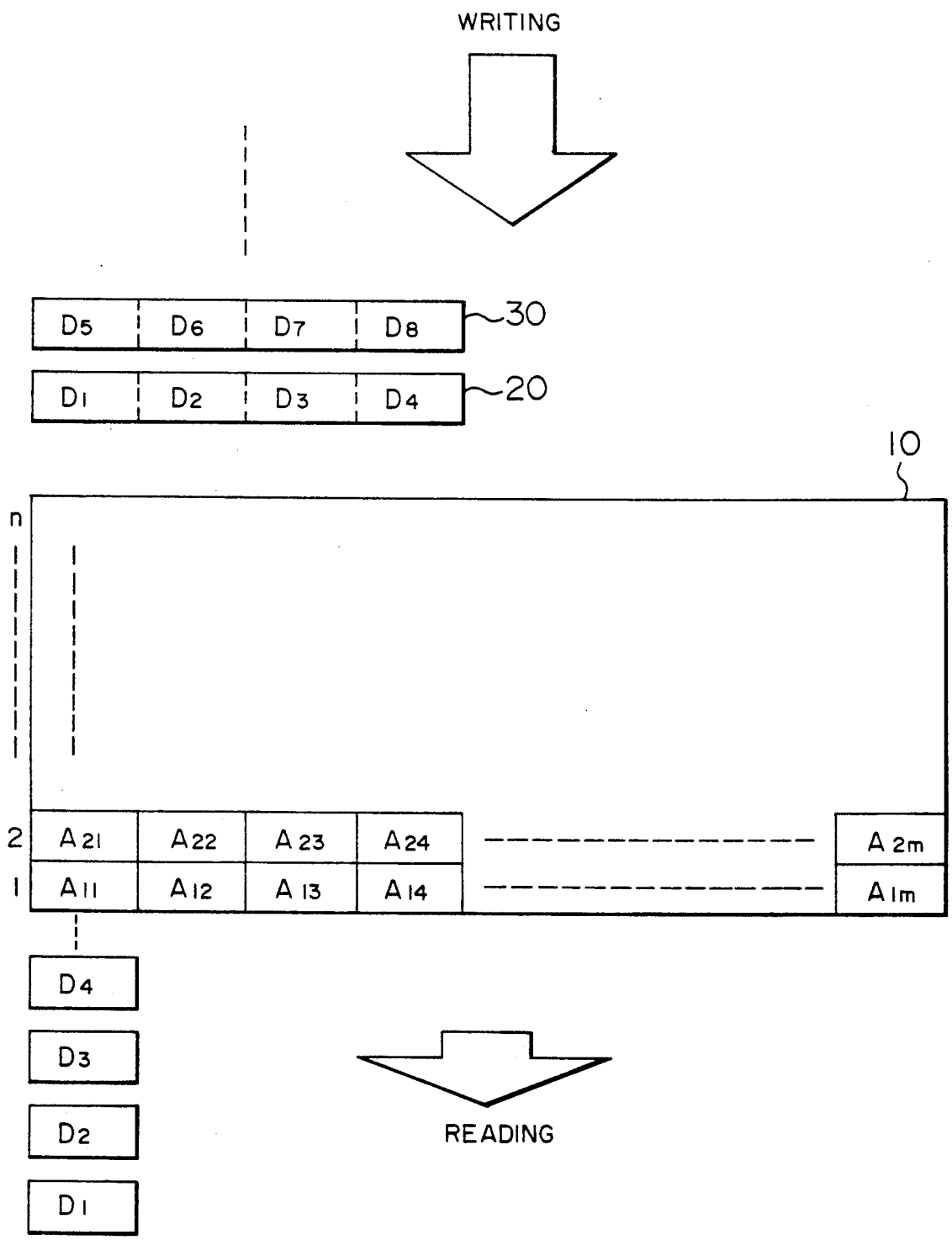
FIG. 2 is a diagram explaining a method of writing and reading data to/from the FIFO memory according to another embodiment of this invention.

Another embodiment of this invention will be explained with reference to FIG. 2. This embodiment is applied in the case where 16-bit long words 20 and 30, which have been processed by a high-speed CPU (not shown), are further processed by a low-speed CPU which is designed to process 4-bit short words. Long words 20, 30 and so on are sequentially stored respectively in the first row, second row and so on of a memory 10. Each 16-bit long word is divided into four short words, and these short words are stored in the four memory areas in one row. For example, a long word 20 is divided into four short words D1, D2, D3 and D4, and they are stored in parallel in memory areas A11, A12, A13 and A14 in the first row, and another long word 30 is divided into four short words D5, D6, D7 and D8, and they are stored in parallel in memory areas A21, A22, A23 and A24 in the second row. In processing the stored data by the low-speed CPU, the short words D1, D2, D3 and D4 are first sequentially read out of the memory areas A11, A12, A13 and A14 in the first row, and next the short words D5, D6, D7 and D8 are sequentially read out of the memory areas A21, A22, A23 and A24 in the second row. In this manner, the long bit-length data 20 and 30 are sequentially read out of the memory as a series of short words D1, D2, D3, D4, D5, D6, D7 and D8.

Figure 3:
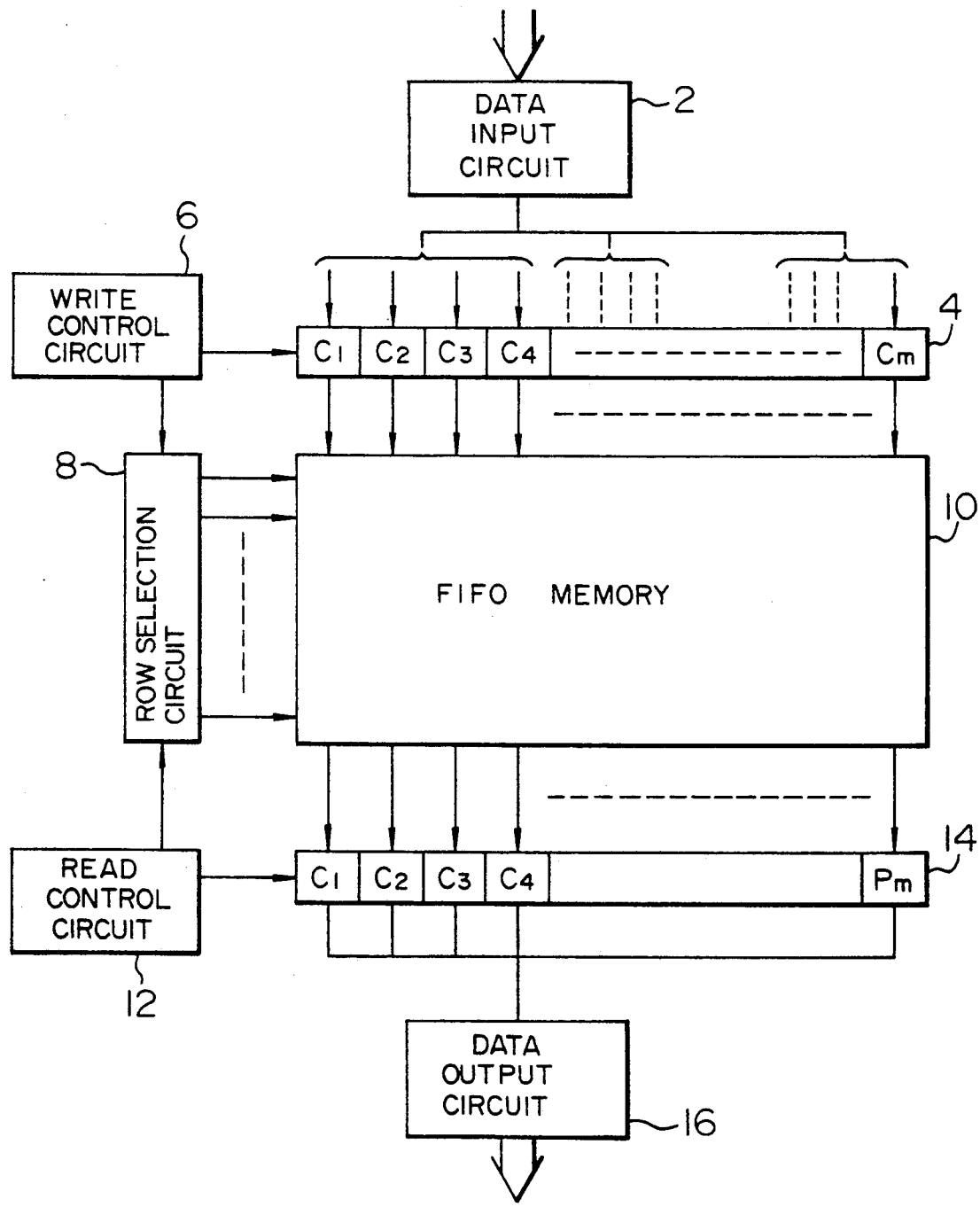
FIG. 3 shows a construction of an apparatus of writing and reading data to/from the FIFO memory according to an embodiment of this invention.

Next, the apparatus according to an embodiment of this invention for implementing the foregoing data write/read operations will be explained with reference to FIG. 3. In the figure, a data input circuit 2 receives a series of long words from a high-speed CPU (not shown), and sequentially stores the long words in a FIFO memory 10 in the respective rows thereof such that each long word is stored in a predetermined number of memory areas in one row, as shown in FIG. 2, by control of a column selection circuit 4 and a row control circuit 8 which are controlled by a write control circuit 6.

The construction of the apparatus will be explained hereafter in a case where the high-speed CPU supplies sequentially 16-bit long words to the memory, and each long word is supplied to the low-speed CPU as a series of four 4-bit short words. The input circuit 2 is connected to the high-speed CPU (not shown) through a data bus made up of 16 lines, which are represented by one line in the figure for simplicity, so that 16 bits of long word are transferred in parallel to the data input circuit 2. The memory 10, which is a type of solid state one memory device as well known, has 4-bit memory areas arranged in a matrix of rows and columns as shown in FIG. 2, and each 16-bit long word is stored in a set of consecutive four memory areas in one row, e.g., $A_{i1}$ to $A_{i4}$ in the i-th row in FIG. 2 (generally, $A_{ik}$ to $A_{i(k+3)}$ where i and k are positive integers). The write column selection circuit 4 includes gate circuits C1, C2, C3 and so on in correspondence to the columns of the memory 10, respectively. The data input circuit 2 has 16 output lines to match the 16-bit long word, and these lines are connected in parallel to the inputs of plural sets of gate circuits, each set including four gate circuits corresponding to four memory areas. The gate circuits C1, C2, C3 and so on have their output lines connected to the data write lines of the corresponding columns.

The write control circuit 6 designates, by means of the column selection circuit 4 and row selection circuit 8, the columns and row of memory areas where the long word is to be stored. For example, in storing a 16-bit long word in 4-bit memory areas A11, A12, A13 and A14 (FIG. 2) in the first row of the memory 10, the write control circuit 6 activates the first row by the row selection circuit 8 and enables the gate circuits C1, C2, C3 and C4 by the column selection circuit 4 corresponding to the memory areas. The 16-bit long word received by the data input circuit is stored through the enabled gate circuits C1, C2, C3 and C4 in the specified memory areas in the first row of the memory 10.

Long words stored in the memory 10 are read out in the same order as the order in writing thereof. A read control circuit 12 designates memory areas storing long words in the same order as the order in writing thereof. For example, in reading out the memory areas A11, A12, A13 and A14, the read control circuit 12 activates the first row by the row selection circuit 8 and enables sequentially the gate circuits C1, C2, C3 and C4 by a read column selection circuit 14 corresponding to the memory areas. The gate circuits in the read column selection circuit 14 have their output lines connected in parallel to the inputs of a data output circuit 16. Consequently, the 16-bit long word stored in the memory areas in the first row is read out as a series of four short words which are supplied through the gate circuits C1, C2, C3 and C4 to the data output circuit 16 sequentially. The four short words are delivered to the low-speed CPU (not shown) sequentially.

Although the foregoing embodiment is the case of receiving a long word from a high-speed CPU and delivering, the word, as a series of short words to a low-speed CPU, it is possible for an apparatus of basically the same circuit arrangement to receive a series of short words from a low-speed CPU and deliver the words as one long word to a high-speed CPU. In this case, the data input circuit has four output lines connected in parallel to the gate circuits in the write column selection circuit, and the data output circuit has 16 input lines connected parallelly to respective sets of gate circuits, each set including four gate circuits, in the read column selection circuit. When a series of 4-bit short words are supplied sequentially, the write control circuit enables sequentially the gate circuits C1, C2, C3 and C4 in the column selection circuit corresponding to the columns of the memory areas where the short words to be stored and activates the row of the memory areas by the row selection circuit. Consequently, the 4-bit short words are sequentially stored in the designated memory areas of the memory. The read control circuit controls the row selection circuit and column selection circuit so that the short words as stored are read out four by four words in the same order as the order in writing thereof. For example, in response to the activation of the first row and the gate circuits corresponding to the four columns, four short words stored in the four memory areas of the selected row and columns are read out at a time. The data output circuit delivers the four short words as one long word to the high-speed CPU (not shown).

Although two circuit arrangements have been explained separately with one to be used for receiving a long word from a high-speed CPU and delivering the word as a series of short words to a low-speed CPU sequentially, and the other to be used for receiving a series of short words from the low-speed CPU sequentially and delivering the words as one long word to the high-speed CPU, there are many components common to both of the circuit arrangements and therefore a single apparatus can be used for both operations merely by switching control mode of the write control circuit and read control circuit.

According to this invention, as described above, data can be received and then delivered in different bit lengths, which enables fast data bit-length conversion for exchanging data between CPUs designed to process words of different bit-lengths, whereby the processing speed of the whole system can be improved.

I claim:

1. A method of writing and reading data into/from a first-in-first-out (FIFO) method having an input port of a predetermined first bit length and an output port of a predetermined second bit length which is different from said first bit length, said method comprising the steps of:
    sequentially writing data supplied to said input port into said memory in first units, each having the same bit length as the longer of said first and second bit lengths; and,
    sequentially reading the data from the memory through said output port in second units in the same order as the data was written in the memory, said second units having a bit length equal to said second bit length.

2. A method of writing and reading data into/from a first-in-first-out (FIFO) memory having an input port for receiving a short word of a predetermined first bit length, an output port for providing a long word of a predetermined second bit length which is N times larger than said first bit length, where N is an integer, and memory areas arranged in a matrix of rows and columns, said method comprising the steps of:
    sequentially writing data including a series of short words of a first bit length, through said input port into said memory so as to consecutively store said short words, whereby sets of consecutive N short words are stored in rows of consecutive memory areas; and,
    successively reading the stored data from the memory through said output port in the same order as that in which the short words were stored in the memory as a set of consecutive N short words at one time comprising a single longer word.

3. A method of writing and reading data into/from a first-in-first-out (FIFO) memory having an input port for receiving a long word of a predetermined first bit length, an output port for providing a short word of a predetermined second bit length which is 1N times of said first bit length, where N is an integer, and memory areas arranged in a matrix of rows and columns, said method comprising the steps of:
    sequentially writing data including a series of long words, each having a length of the first bit length, into the memory such that each long word is sequentially stored in one row in the memory;
    sequentially reading the stored data from the memory in the same order as that in which the long words are stored, such that each stored long work in each row of the memory is divided into consecutive N short words, each having a length of the second bit length.

4. A memory device for storing information comprising:
    a plurality of memory areas arranged in a matrix of rows and columns;
    an input port having a predetermined first bit length;
    an output port having a predetermined second bit length different from said first bit length;
    writing means for sequentially writing data supplied to said input port into said memory areas in first units of said data, each first unit having the same bit length as the larger of said first and second bit lengths; and,
    reading means for sequentially reading out the stored data from said memory in second units of said data int he same order as that in which said data was stored in the memory, each second unit having a length equal to the second bit length.

* * * * *